United States Patent [19]

Mueller

[11] 4,206,984
[45] Jun. 10, 1980

[54] OVERHEAD PROJECTOR

[75] Inventor: Paul A. Mueller, Neuss, Fed. Rep. of Germany

[73] Assignee: Ed. Liesegang, Düsseldorf, Fed. Rep. of Germany

[21] Appl. No.: 941,669

[22] Filed: Sep. 12, 1978

[30] Foreign Application Priority Data

Oct. 26, 1977 [DE] Fed. Rep. of Germany ....... 2747916

[51] Int. Cl.² ............................................. G03B 21/16
[52] U.S. Cl. .......................................... 353/61; 353/98
[58] Field of Search ...................... 353/38, 66, 98, 100, 353/DIG. 4, DIG. 6, 57, 61; 362/287, 226, 427

[56] References Cited

U.S. PATENT DOCUMENTS

| 3,209,646 | 10/1965 | Appeldorn et al. | 353/98 |
| 3,293,982 | 12/1966 | Appeldorn | 353/DIG. 4 |
| 3,340,765 | 9/1967 | Herriott | 353/DIG. 4 X |
| 3,711,194 | 1/1973 | Wilson | 353/98 X |
| 3,762,809 | 10/1973 | Kato et al. | 353/DIG. 4 |

FOREIGN PATENT DOCUMENTS 886062  1/1962  United Kingdom ..................... 362/287

Primary Examiner—Charles E. Phillips
Attorney, Agent, or Firm—Spencer & Kaye

[57] ABSTRACT

A projector comprises a base carrying a working surface for matter whose image is to be projected and a side stand on which a casing is mounted, extending over the working surface, the casing having a two part lamp housing with the upper part carrying a reflector and the lower part movably mounted with respect to the upper part carrying a condenser lens, a lamp being positioned between the reflector and the condenser.

17 Claims, 3 Drawing Figures

OVERHEAD PROJECTOR

BACKGROUND OF THE INVENTION

The invention relates to a projector such a projector may have a collecting reflector as a working surface and a casing arranged above this reflector and carried by a lateral stand, in which casing a deflecting mirror, a projection lens and a lamp housing are arranged, whereby the lamp housing has a concave mirror, a condenser lens and a lamp which is in a set position and is arranged between the latter.

With this type of projector, the light radiated by the lamp and focused by the condenser lens is thrown on to the reflector. The latter is usually constructed as a Fresnel lens and mirror-coated so that the light can be reflected in a direction on to the projection lens and on to the deflecting mirror. If a sheet is placed on to the working surface and if the sheet is written on, then the image of the writing can be projected on to a surface with the air of the deflecting mirror so that it can be easily seen by a large number of spectators.

With known projectors of this type it is very difficult to replace the lamp. Essentially this has two causes, one of which consists in the fact that the lamp is fairly inaccessible because of the design of the lamp housing and parts of the lamp housing have to be removed in a relatively complicated manner in order to be able to take out the lamp from its socket. The second cause is connected with the previously insufficient cooling resulting from the previously relatively compact design of the lamp housing which impairs the radiation of heat. This results in the fact that, in the case of a defect in the lamp, a certain period of time has to elapse before the parts of the lamp housing which are to be dismantled in order to change the lamp can be handled. This is very disruptive if the defect in the lamp arises during use. In addition, a tool is required for the purpose of dismantling the relevant parts of the lamp housing and this is also disadvantageous.

SUMMARY OF THE INVENTION

It is an object of the invention to provide an improved projector in which changing of the lamp can take place in a manner which is substantially simpler and can take place without the difficulty caused by parts of the lamp housing being too hot.

According to the invention, there is provided a projector comprising a base, a working surface carried by said base for receiving matter whose image is to be projected, a stand extending upwardly from said base to one side of said working surface, a casing carried by said stand and extending over said working surface, a lamp housing in said casing comprising a fixed upper part carrying a concave mirror and a lower part carrying a condenser lens, means permitting movement of said lower part relative to said upper part, a lamp for illuminating said working surface and positioned between said concave mirror and said condenser lens and projection means for projecting an image of matter on said working surface.

BRIEF DESCRIPTION OF THE DRAWINGS

The invention will now be described in greater detail, by way of example, with reference to the drawings, in which.

DESCRIPTION OF THE PREFERRED EMBODIMENT

Figure 1:
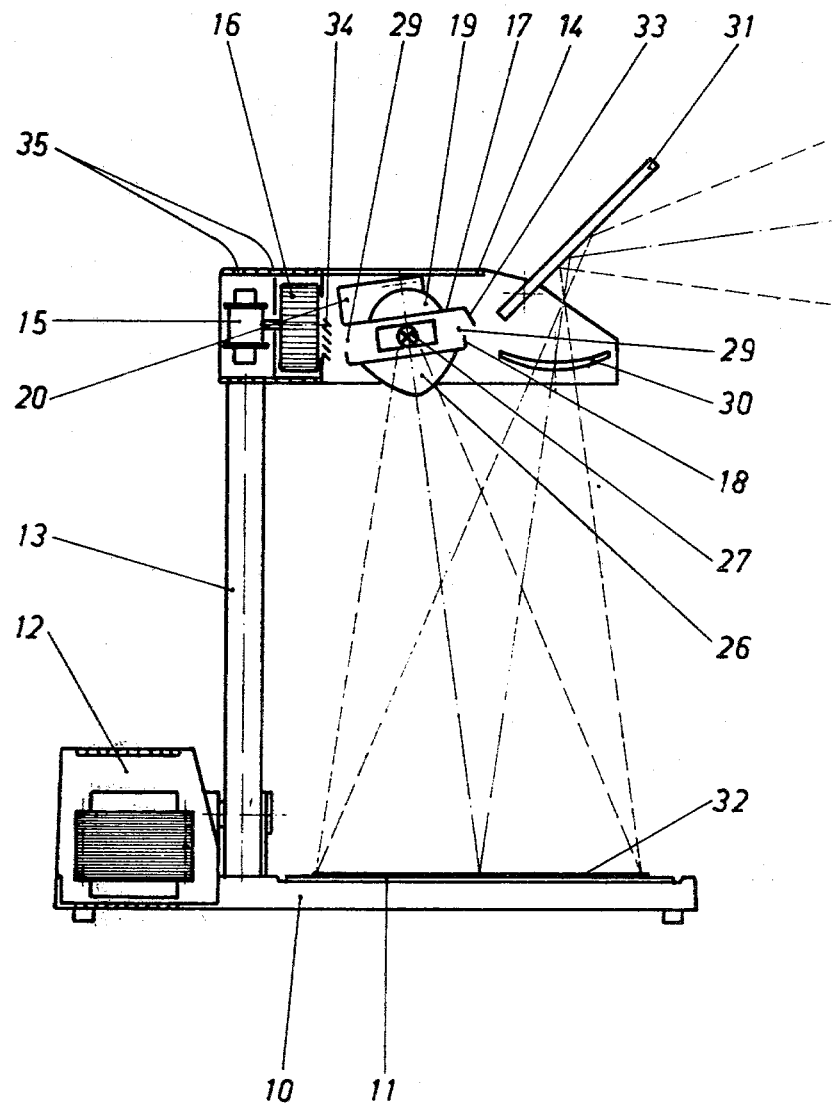
FIG. 1 shows a projector which is shown in the region of its casing as a schematic section and in view moreover.
Figure 3:
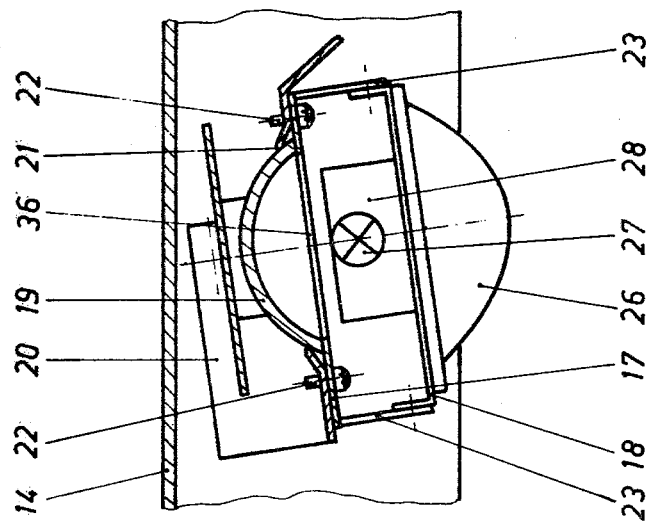
FIG. 3 shows a section along the line III—III of FIG. 2.
Figure 2:
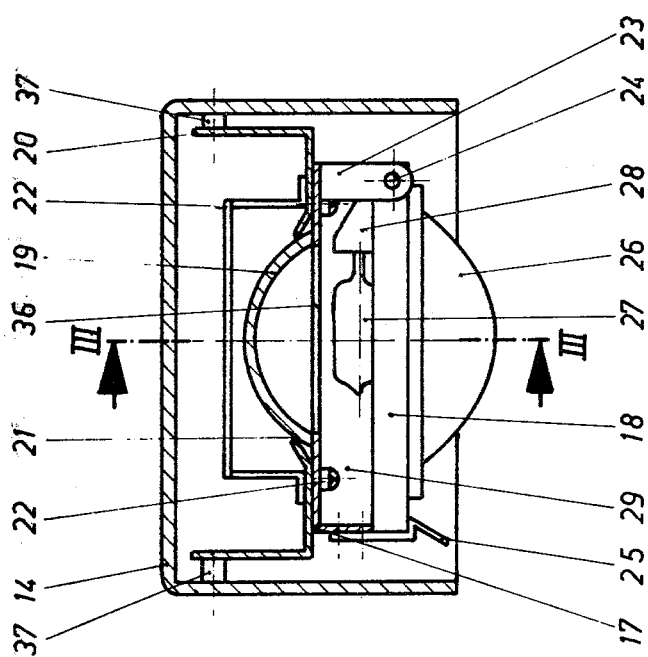
FIG. 2 shows a part of the view according to FIG. 1 on an enlarged scale and in cross-section.

In a preferred embodiment of the invention, in a projector as stated at the outset, it is proposed that the lamp housing should be subdivided into an upper part carrying a concave mirror and fixed in relation to the casing of the projector and a lower part carrying a condenser lens and movable in relation to the upper part; that the casing should contain a fan and that free side regions should be formed between the parts of the inner casing approximately at the height of the lamp, these side regions forming openings for a flow of air produced by the fan.

Owing to the proposed subdivision of the lamp housing in simple manner, there is a mobility of the lower part blocking access to the lamp which can be retained in its operating position with the aid of simple mountings to be actuated without a tool and which can be removed rapidly when necessary, whereby the mobility of the lower part may consist in displaceability or pivotability with respect to the fixed part of the lamp housing or may consist in it being completely removed therefrom. The constructional subdivision of the lamp housing furthermore makes a particularly effective arrangement of a flow of air possible in the region of the lamp housing, more particularly in the region surrounding the lamp. As a result rapid cooling is ensured even of those parts of the lamp housing which have to be handled when changing the lamp. Changing the lamp can therefore take place shortly after the lamp has failed.

However, since the heat obtained in the inner casing can be dissipated substantially better during operation, there is a substantially lesser heat build up in the region of these parts. This is not only advantageous for possibly changing the lamp but also for the operation itself as the lamp can now have a substantially larger power.

These advantages can be achieved if the lamp is arranged on the fixed part of the inner casing. In contrast to this, the accessibility of the lamp is improved still further if, in accordance with a further proposal of the invention, the lamp is mounted on the movable part of the lamp housing so that the lamp is almost completely free after the movable part has been pushed away, pivoted away or removed.

It is particularly favourable if the movable part of the lamp housing can be pivoted away about a horizontal axis in a downward direction. In the operating position, the movable part of the lamp housing can be supported with the aid of a releasable closure, preferably with the aid of a catch or spring lock.

In order to be able to pivot away the movable part of the lamp housing and the lamp as far as possible out of the inner space of the casing, it is advisable if the axis is as low as possible, in any case lower than the free side regions of the lamp housing.

Changing the lamp is made easier if, in accordance with a further proposal of the invention, the holder therefore is arranged on that side of the movable part of the lamp housing on which the pivot axis is located.

When the part of the inner casing is pivoted downwards, the bulb of the lamp is then also directed downwards; it is in that direction from which changing of the lamp must be undertaken in this case.

The connecting lines are mechanically loaded as little as possible for example by bending or twisting as a result.

Furthermore, in accordance with the invention, it is proposed that the fixed part of the inner casing should be fixed to a base member connected to the casing of the episcope, the base member having an aperture which is penetrated by the concave mirror. Furthermore, the edge of the aperture in the base member can be constructed as an annular edge bent upwards from the plane of the aperture, this annular edge resting on the outside of the concave mirror while the lamp housing is also apertured circularly in this region and the concave mirror is supported on the edge of this appropriately dimensioned aperture.

Simple adjustability of the lamp housing with respect to the casing of the projector and thus with respect to the working surface can then be achieved, if the fixed part of the lamp housing and the base member are connected so as to be displaceable with respect to each other in a direction which is radial with respect to the optical axis, and this can be achieved for example by using appropriate adjusting screws the diameter of which is smaller than the corresponding apertures.

In order to prevent possible escape of light towards the lens and the deflecting mirror because of the free regions of the lamp housing, it may be advisable for the lamp housing to be provided, at least on its side facing the projection lens and the deflecting mirror with a covering strip which shields the free region against direct escape of light.

Since the projection lens and the deflecting mirror are generally located at the end of the casing of the projector which is opposite to the stand and the projector casing must be substantially open at least in this region in order to allow the beam of light reflected from the working surface to arrive at the projection lens and the deflecting mirror, this part of the projector casing can at the same time serve to guide the flow of air which causes dissipation of heat, this flow of air reaching the lamp housing from there as a suction flow and, after passing through the housing, reaches the fan. In this connection it is advantageous, in accordance with a further proposal of the invention, if a radial fan is arranged in the casing on the side of the casing adjacent the stand so that the axis of rotation of its fan wheel lies approximately parallel to the longitudinal axis of the casing and if air sucked out of the casing in an axial direction and given off by the fan wheel in a radial direction is conducted away through side outlet openings in the casing. The longitudinal axis of the casing corresponds therefore to the path from the projection lens through the lamp housing to the fan wheel.

Furthermore a further covering strip or a heat-protecting grating can be arranged between the lamp housing and the fan wheel because, more particularly with an embodiment of the fan wheel from plastics, it may be advisable to prevent direct radiation of heat from the lamp on to the fan wheel.

If moreover a lamp designed for operation at low voltage is used, it is advisable to design the drive motor of the fan for the same voltage and to connect it parallel to the lamp.

Referring now to the drawings, a projector has a baseplate 10 into which a working surface 11 is inserted in the form of a Fresnel lens. Furthermore a main unit 12 is arranged on the baseplate 10 in which a low voltage is produced. This voltage is generally between 12 volts and 32 volts; in the present device it is 24 volts.

A stand 13 extends upwardly from the baseplate 10 and carries the upper part of the projector. To this part belongs a casing 14 which is mounted on the stand 13. Inside the casing 14 is arranged a radial fan on the side adjacent the stand 13, the radial fan comprising a drive motor 15 and a fan wheel 16. Then a lamp housing follows which is subdivided into an upper part 17 and a lower part 18. The upper part 17 is formed substantially by a flat sheet which has a circular aperture 36. The diameter thereof is selected so that a concave mirror 19 can be supported axially by its edges on the edge of the recess 36. A base member 20 inserted into the casing 14 and mounted by screws 37 is bent in U-shape at two opposite sides and is provided at the centre with a recess 21 which is dimensioned so that its upwardly bent edge which is bent from the recess plane can abut the outside of the concave mirror 19 and can retain the latter both axially and radially. The fixed part 17 of the inner casing and the base 20 are connected together by adjusting screws 22, these adjusting screws 22 being smaller in diameter than the apertures assigned to them so that a radial displacement of the entire lamp housing is possible with respect to the casing 14 to an extent which is sufficient for adjustment.

The upper part 17 of the lamp housing is provided with angled parts 23 which are bent in a downward direction at one end, the lower part 18 of the lamp housing being mounted on a pivot 24 at the ends of these angles 23. The upper part 17 of the lamp housing has a spring 25 extending in a downward direction at the opposite side, the spring engaging under the lower part 18 of the lamp housing in the position shown here and retaining it thereby in a position parallel to the upper part 17. The spring 25 can be deflected towards the side by hand so that the lower part 18 is released in order to be pivoted outwards and downwards.

The lower part 18 of the lamp housing carries a condenser lens 26 and a lamp 27 the holder 28 of which is arranged on the same side of the lower part 18 of the lamp housing as the pivot 24.

Openings 29 are formed between the upper part 17 and the lower part 18 of the lamp housing at two opposite sides these openings facilitating direct access to the lamp 27 by the flow of air which passes through, so that the heat given off by the lamp can be carried away immediately.

This direction of passage of the flow of air coincides approximately with the longitudinal axis of the casing 14 which extends from the drive motor 15 up to the opposite end of the casing, a projection lens 30 and a deflecting mirror 31 being arranged in the region thereof. As the path of the beam indicated in FIG. 1 shows, the beam of light produced by the lamp 27 and focused with the aid of the concave mirror 19 and the condenser lens 26 hits the reflecting working surface 11. If a transparent sheet 32 which has been placed on the working surface 11 is written on then the image of the writing is passed by the projection lens 30 on to the deflecting mirror 31 with the aid of the reflected beam of light, said deflecting mirror 31 projecting this image in a horizontal direction on to a surface not shown here.

The upper part 17 of the lamp housing is provided on its side facing the projection lens 30 and the deflecting mirror 31 with a covering strip 33 which is angled downwardly, said strip 33 preventing direct outlet of light at the side so that the path of the beam passing through the projection lens 30 in the direction on the deflecting mirror 31 cannot be interfered with.

The light which may be escaping in the direction on to the fan wheel 16 initially falls on to a heat absorbing grid 34 so that direct heating of the fan wheel 16 by means of this light is avoided.

The fan wheel 16 driven by the drive motor 15 sucks in air which can enter through the openings present in the casing 14 in the region of the projection lens 30 and the deflecting mirror 31.

Part of the flow of air sucked in through the fan wheel 16 passes through the two openings 29 while other part can pass above the base member 20. A partial flow of air can also sweep along the condenser lens 26. All partial flows of air are united on entry into the fan wheel 16 in an axial direction. The air conveyed by the fan wheel 16 passes out radially and reaches the open air through openings 35 in the casing 14. Another partial flow of air can additionally be guided past the drive motor 15 so that the heat given off thereby can be removed.

In order to change the lamp 27 it is only necessary to press aside the spring 25 by hand so that the lower part 18 of the lamp housing can pivot downwards. The bulb of the lamp 27 is directed perpendicularly downwards so that it can be easily unscrewed or drawn out of its holder 28.

It will be understood that the above description of the present invention is susceptible to various modification changes and adaptations.

What is claimed is:

1. A projector comprising a base, a working surface carried by said base for receiving matter whose image is to be projected, a stand extending upwardly from said base to one side of said working surface and a casing carried by said stand and extending over said working surface, the improvement comprising a lamp housing in said casing including a fixed upper part carrying a concave mirror and a lower part carrying a condenser lens, means permitting movement of said lower part relative to said upper part, a lamp for illuminating said working surface and positioned between said concave mirror and said condenser lens, projection means for projecting an image of matter on said working surface and a base member for attaching said upper part of said lamp housing to said casing and defining an aperture through which said concave mirror projects.

2. A projector as defined in claim 1, further comprising an annular edge portion surrounding said aperture of said base member and bent upwards from the plane of said aperture to engage the outside of said concave mirror and said upper part of said lamp housing defines a circular aperture on the edge of which said concave mirror is supported.

3. A projector as defined in claim 2, further comprising means for connecting said upper part of said lamp housing and said base member for enabling relative displacement and locking of said upper part and said base member radially with respect to the optical axis of said projector.

4. In a projector having a reflecting working surface for receiving the matter whose image is to be projected; a stand extending upwardly from a side of the reflecting working surface; a casing carried by the stand and extending over the reflecting working surface; a lamp, a concave mirror and a condenser lens supported by the casing and cooperating for directing a light beam through an opening in the casing onto the reflecting working surface; and projection means comprising a projector lens and a deflecting mirror supported by the casing and cooperating for directing the light reflected from the reflecting working surface onto a surface remote from the projector; the improvement comprising
  (a) a lamp housing accommodated in said casing and having
    (1) a stationary upper part carrying said concave mirror and being attached to said casing;
    (2) a movable lower part carrying said lamp and said condenser lens;
    (3) mounting means for movably securing said lower part to said upper part, whereby said lower part is arranged to assume a closed, operative position in which said lower part is maintained in a fixed relationship with respect to said upper part and an open, downwardly displaced inoperative position in which access is provided to said lamp through said opening in said casing;
    (4) means defining lateral ventilating apertures in said lamp housing between said upper and lower parts thereof approximately at the level of said lamp;
  (b) adjusting means for adjusting the position of said lamp housing with respect to an optical axis of said projector; and
  (c) a fan supported in said casing for generating an air flow passing through said ventilating apertures.

5. A projector as defined in claim 4, said mounting means comprising a pivot having a horizontal axis and connecting said upper and lower parts of said lamp housing to permit said lower part to pivot downwardly away from said upper part and a releasable lock for retaining said lower part in said operative position relative to said upper part.

6. A projector as defined in claim 5, wherein said releasable lock is a catch.

7. A projector as defined in claim 5, wherein said releasable lock is a spring lock.

8. A projector as defined in claim 5, wherein the axis of said pivot lies below said lateral ventilating apertures.

9. A projector as defined in claim 5, further comprising a holder for said lamp arranged on the same side of said lower part of said lamp housing as said pivot.

10. A projector as defined in claim 4, further comprising a base member for attaching said upper part of said lamp housing to said casing and defining an aperture through which said concave mirror projects.

11. A projector as defined in claim 10, further comprising an annular edge portion surrounding said aperture of said base member and bent upwards from the plane of said aperture to engage the outside of said concave mirror and said upper part of said lamp housing defines a circular aperture on the edge of which said concave mirror is supported.

12. A projector as defined in claim 10, wherein said adjusting means comprises means for connecting said upper part of said lamp housing and said base member for enabling relative displacement and locking of said upper part and said base member radially with respect to the optical axis of said projector.

13. A projector as defined in claim 4, further comprising a covering strip positioned in a free region between said lamp housing and said projection means to shield said projection means from direct escape of light from said free region.

14. A projector as defined in claim 4, wherein said fan is a radial fan arranged in said casing on a side of said casing adjacent said stand with the axis of rotation of its fan wheel approximately parallel to a longitudinal axis of said casing; and lateral openings defined by said casing for guiding away air sucked from said casing in an axial direction by said fan wheel and given off in a radial direction.

15. A projector as defined in claim 14 further comprising a heat covering protection device arranged between said lamp housing and said fan wheel.

16. A projector as defined in claim 14 further comprising a parallel electrical connection of a drive motor for said fan and said lamp.

17. A projector as defined in claim 16, wherein said drive motor and said lamp are designed for low voltage operation.

* * * * *